US008352383B2

(12) United States Patent
Calman et al.

(10) Patent No.: US 8,352,383 B2
(45) Date of Patent: Jan. 8, 2013

(54) SYSTEMS AND METHODS FOR ALTERING MAIL ROUTING, MAIL PROCESSING, AND/OR MODE OF DELIVERY (75) Inventors: Matthew A. Calman, Charlotte, NC (US); David T. Frew, Fort Mill, SC (US); Robert Leonard Kee, Charlotte, NC (US); Johnny David Phillips, Charlotte, NC (US); Truxton B Pratt, Charlotte, NC (US); Kim D. Smith, Derby, KS (US); Michael A. Tate, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 449 days.

(21) Appl. No.: 11/962,992

(22) Filed: Dec. 21, 2007

(65) Prior Publication Data

US 2009/0164390 A1   Jun. 25, 2009

(51) Int. Cl.
*G06Q 30/00* (2012.01)
(52) U.S. Cl. ......... 705/332; 705/330; 705/403; 705/401
(58) Field of Classification Search .................. 705/400, 705/401, 410, 1, 33 X
See application file for complete search history.

(56) References Cited

U.S. PATENT DOCUMENTS

| | | | | |
|---|---|---|---|---|
| 6,121,565 | A * | 9/2000 | Allott, III | 209/584 |
| 6,526,393 | B1 * | 2/2003 | Fredman | 705/408 |
| 6,549,892 | B1 * | 4/2003 | Sansone | 705/401 |
| 2002/0165729 | A1 * | 11/2002 | Kuebert et al. | 705/1 |
| 2003/0037009 | A1 * | 2/2003 | Tobin et al. | 705/65 |
| 2003/0208364 | A1 * | 11/2003 | Deans et al. | 705/1 |
| 2004/0093312 | A1 * | 5/2004 | Cordery et al. | 705/401 |
| 2004/0117328 | A1 * | 6/2004 | Andrew | 705/410 |

(Continued)

FOREIGN PATENT DOCUMENTS

| | | |
|---|---|---|
| DE | 196 44 163 A1 | 5/1998 |
| WO | WO 03/034293 A1 | 4/2003 |

OTHER PUBLICATIONS

International Search Report and Written Opinion of the International Searching Authority mailed Jul. 28, 2009 for International Application No. PCT/US2008/087747.

(Continued)

*Primary Examiner* — John Hayes
*Assistant Examiner* — Brian Epstein
(74) *Attorney, Agent, or Firm* — Michael A. Springs; Moore & Van Allen PLLC; Patrick B. Home (57) ABSTRACT

The present invention provides systems, methods, and computer program products for altering delivery of a piece by altering either the delivery address, mode of processing, and/or the mode of delivery. The invention provide an indicia associated with the piece of mail including instructions that are at least one of a different delivery address, mode of processing, or a mode of delivery than that originally designated for the piece of mail. During mail sorting and processing, the indicia associated with the piece of mail are analyzed. Either the delivery address, mode of processing, and/or mode of delivery currently associated with the piece of mail are altered to conform with the delivery address, mode of processing, and/or mode of delivery indicated by the indicia. In some embodiments, the indicia is altered by on a business parameter, such as a monetary value associated with the contents of the piece of mail.

27 Claims, 3 Drawing Sheets

U.S. PATENT DOCUMENTS

| | | | |
|---|---|---|---|
| 2005/0125345 A1* | 6/2005 | Miller et al. | 705/40 |
| 2005/0137990 A1* | 6/2005 | Mayer et al. | 705/410 |
| 2006/0122851 A1* | 6/2006 | Ryan, Jr. | 705/1 |
| 2007/0156415 A1* | 7/2007 | Foth et al. | 705/1 |
| 2007/0260561 A1* | 11/2007 | Martin et al. | 705/403 |
| 2008/0208772 A1* | 8/2008 | Rundle | 705/410 |
| 2010/0049360 A1* | 2/2010 | Stemmle | 700/223 |

OTHER PUBLICATIONS

International Preliminary Report on Patentability mailed Jul. 1, 2010 for International Application No. PCT/US2008/087747.

* cited by examiner

SYSTEMS AND METHODS FOR ALTERING MAIL ROUTING, MAIL PROCESSING, AND/OR MODE OF DELIVERY

BACKGROUND OF THE INVENTION

1. Field of the Invention

The present invention relates generally to systems and methods for creation, sending, sorting, and delivery of mail, and more importantly to altering mailing parameters, such as delivery addresses, mode of processing, and/or mode of delivery, based on business parameters associated with the content or nature of the mail or characteristics of the sender.

2. Description of the Related Art

Under certain circumstances, a recipient of mail may wish to expedite receipt of the mail for business reasons. For example, where the mail includes a high value payment from a customer business reasons, such as prevailing interest rates, may dictate expediting receipt of the payment despite added mail delivery cost. Similarly, where the mail includes an executed contract, expedited receipt of the mail delivery is likely preferred.

In some instances, the sender may purposely delay mail delivery. The sender may wish to take advantage of the "float" between the time payment is placed in the mail and when it is delivered, relying on the mailing date as timely transmittal of payment. Further, many senders will choose lowest cost mailing options for sending payments.

In some instances, a recipient of mail may request that the mail be sent to a particular address, which will aid in processing the mail once received. Typically, such account processing centers are located at addresses that are remote from the location of the sender, such as in different cities or states. Some senders are reluctant to send payments to remote locations, preferring instead, to send the payments to a local address of the recipient. Similarly, customers who outsource their invoice and payment processing in a "lockbox" arrangement may desire to keep the invoice payment address unchanged to conceal the outsourcing arrangement.

Reasons other than the value of the contents of the mail may dictate expediting delivery. For example, a recipient may wish to expedite return mail sent by preferred customers. This may provide better customer service due to expedited response to customer correspondence.

Up until now, recipient-dictated modes of delivery have been rudimentary at best. Typically, the recipient will need to send a postage paid, self-addressed return envelope along with the original mailing to ensure desired return mail mode. This can be costly where the customer fails to use the return mailer or alters the return mailer, such as address. Further, such a system does not allow for real-time or semi-real-time decisions based on changing business factors.

"Mail Intercept" services have been available, where postal carriers will manually redirect whole blocks of mail from one destination to another. Typically this is performed on a zip-code or zip+4 code basis, rather than on a piece basis, and does not allow the granularity of choices available in the invention.

As an example, when a bill was sent, if the interest rates were fairly high, the account manager may have sent a return mailer with the bill that had a pre-paid expedited mode of delivery so that the account manager would receive payment more timely. However, during the delay of receipt of the bill by the customer and the customer initiating return payment, interest rates may have lowered to the point that the cost of expedited delivery outweighs the benefit of early receipt of the payment.

As another example, an account manager may operate more than one account processing facility located at different addresses, which are both capable of processing payments. It may be preferable to direct payments to either one of the facilities based on processing workloads at the facilities at a given time. Such processing workloads may be difficult to predict at the time the bill is sent with the return mail envelope to the customer. Real-time or semi-real-time determinations regarding routing of return mail may be needed in this instance.

In some instances, mail delivery services may have different processing procedures for different classes of mail, where higher class mail is processed more timely. Here again, it may be advantageous to indicate to the mail delivery service the desire to expedite certain mail regardless of how the sender initially sent the piece of mail. In some instances, the mail delivery service may have different facilities where a piece of mail may be processed. Providing an indication to the mail delivery service regarding expedited delivery may aid the mail service provider in determining which processing center to use for the mail processing based on current processing delays at each facility. In some instances, it may be advantageous to include indication on the piece of mail informing the mail processing service to process the piece of mail at a particular processing location that may either have expedited processing and/or special procedures in place for processing mail from or to a particular entity. Up to now, there are no known procedures for providing such information to the mail delivery service.

BRIEF SUMMARY OF THE INVENTION

Embodiments of the present invention provide various ways to allow for alteration of mail delivery for one piece of mail, a group of mail pieces, or groups of groups of mail pieces by either rerouting to a different address, altering the mode of mail processing, and/or altering the mode of mail delivery (herein sometime referred to collectively as "mailing parameter(s)"). Based on the contents of the mail, prevailing business issues, the status of the sender of return mail, etc., the invention allows a sender or a recipient to dictate mail processing and/or delivery for mail either sent by them or to them.

For example, in one embodiment, the present invention provides a method for altering delivery of a piece of mail. In this embodiment, an indicia is associated with the piece of mail including instructions that are at least one of a different delivery address, mode of mail processing, or a mode of delivery than that originally designated for the piece of mail. The indicia may be in any form. It could be visual, such as a note regarding either the mailing address to be used, a mail processing procedure or processing location to be used, or a mode of delivery to be used. In other embodiments, the indicia may be machine-readable, such as a bar code, magnetic strip, hologram, data in a radio frequency identification tag (RFID), etc. In some embodiments, it may be advantageous for the indicia to not be machine readable, such that the sender is not confused by the mail delivery alteration information in the indicia.

The indicia are analyzed during mail processing and delivery. Using the indicia, either one, some, or all of the mail delivery address, mode of processing, and/or mode of delivery currently associated with the piece of mail is altered to conform to the delivery address, mode of processing, and/or mode of delivery indicated by the indicia.

The piece of mail including the indicia may be any type of mail. It could be a piece of mail sent by an original sender, where either a delivery address, mode of processing, or mode of delivery is desired over that originally specified for the piece of mail. It could be a return mail envelope provided to a customer to be used when the customer returns payment or the like in response to, for example, receipt of a bill.

The systems, methods, and computer program products of the present invention are at least capable of altering the mail address, mode of processing, or the mode of delivery used to process and deliver a piece of mail. The term mode of delivery is contemplated to represent any type of change that may be made in the way the mail is processed and/or delivered. For example, mode of delivery may mean mail priority, such as first class, ground transportation, next day, two-day, etc. delivery. It could refer to mail security or verification levels, such a certified mail with requested receipt. It may refer to package handling, such as fragile nature of the package or may be indicate that the package may contain biohazards. Mode of processing may be an overlapping term with mode of delivery. Mode of processing may refer to processes, procedures, processing locations, etc. used by a mail delivery service to process mail. For example, mail delivery services may have expedited mail processing for different classes of mail. These services may have specific processing procedures used for specific mail recipients. For example, a bank may have specific mail processing procedures used by a mail delivery service for at least some of the mail either sent by or mailed to the bank.

The present invention also provides systems and methods for determining when the current mail delivery address, mode of processing, and/or mode of delivery should be altered. In general, any reason can be used, but typically the reason for such alteration is related to a business parameter. In this embodiment, the piece of mail is analyzed based on at least one business parameter. A determination is made as to whether at least one of a different delivery address, mail processing mode, or a mode of delivery associated with the piece of mail should be altered based on the evaluation and providing an indicia for the piece of mail conforming with the new delivery address, mode of processing, and/or mode of delivery. Some examples of possible business parameters are: category of the mail, a monetary value associated with the contents of the piece of mail, value or status of the customer, current interest rates, proximity in time to a fiscal date, etc.

The present invention also provides a customer service function. It may allow a customer to pay from one class of mail delivery, while the piece of mail is actually delivered by a second mode that is paid for by the account manager. For example, a return mailer sent with a bill may allow a customer to return the mailer using first class mail. However, indicia may be provided on the return mailer indicating to the mail delivery system to use a second mode of delivery for the return mailer, such as overnight. The overnight charge would be billed to the account manager and not the customer.

As another example, so as to avoid confusion by the customer, the return mailer may include a local address for sending the return mailer so as to provide a comfort level to the customer concerned with sending payments to non-familiar addresses or locations. However, the return mailer may also include indicia indicating to the mail delivery service to change the delivery address to a new selected address selected by the account manager when the piece of mail is delivered to the account manager.

In some embodiments, the present invention may provide for real-time or semi-real-time determinations regarding changing mailing parameters for a piece of mail. Specifically, the present invention may allow the account manager to communicate with a mail delivery service to alter a mail delivery parameter.

For example, in this embodiment, the indicia on the piece of mail may include a unique identification number for the piece of mail or a unique identifier for a class or category of mail. (It may also include an initial mail redirection, mode of processing, or change mail delivery mode selected by the account manager). The mail delivery service may contain a database for each piece of mail or class/category of mail, along with one or more of a change of mail delivery address, mode of processing, or mode of mail delivery. Any time during the period where the mail is either in processing or mail delivery or located with the customer, the account manager may transmit a request to the mail delivery service that includes the ID of the piece of mail and instructions regarding one or more of change of mail address, mode of processing, and/or change in mode of delivery. As such, the mailing parameters for a piece of mail can be altered even after the piece of mail has been mailed or mailing parameters for a class or category of mail can be easily altered by making changes to records in the database associated with mail in the given class or category.

In some instance, the piece of mail may have no original mailing address, mode of processing, or mode of delivery at all. Instead, the mailing parameters for the piece of mail may be dictated by the indicia included on the mail. In some embodiments, the indicia itself may include the mailing parameters and in other instances, the mailing parameters may be stored in a database referenced by an identification number stored in the indicia. Where the mailing parameters are stored in the database, the mailing parameters for the piece of mail may be altered without requiring a user to physically alter either the parameters printed on the piece of mail or the indicia on the piece of mail.

In short, the present invention provides systems, apparatus, methods and computer program products for altering delivery of a piece of mail by supplying indicia on the piece of mail that dictates one or more of a different delivery address, mode of processing, or a mode of delivery than that originally designated for the piece of mail. This allows one to control the parameters used for mail delivery. For example, account managers may have control on the mailing parameters used for return mailings from customers.

DETAILED DESCRIPTION OF THE INVENTION

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-readable medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

As known to those skilled in the art, there are various parameters that affect the processing and delivery of mail. One parameter is delivery address. Others relate to how the piece of mail is processed by a mail delivery service. While still others relate to the mode of delivery. The present invention contemplates systems, methods, and computer program products that allow a person or entity associated with a piece of mail to alter any one or combination of mailing parameters associated with a piece of mail. For example, a sender of a piece of mail may have the ability to dictate mailing parameters for a piece of mail that are different than those originally designated for the piece of mail. Similarly, a prospective recipient of a piece of mail may also have the ability to dictate mailing parameters for a piece of mail they are to receive.

As an example, an account management system may send mail requiring return correspondence to a customer, such as a bill requiring return payment. (Note, that herein the terms "account manager" and "account manager system" are used broadly herein to refer to any individual or entity that corresponds with another individual or entity via mailings). The account management system may wish to control mailing parameters for the mail outgoing to the customer and also the mailing parameters for the mail returned by the customer. In some embodiments, the systems, methods, and computer program products of the present invention may allow for the inclusion of indicia on the piece of mail dictating one or more of a different mailing address, mode of mail processing, or mode of mail delivery from that originally designated for the piece of mail.

In other embodiments, the indicia may include an unique identifier for the piece of mail or a class or category of mail that is associated with a database maintained by either one or both the account management system and the mail delivery service. The database includes the mailing parameters for the piece of mail that can be altered by the account management system to alter one or more of the mailing address, mode of processing, or mode of mail delivery for the piece of mail. During the processing and delivery of the piece of mail, the mail delivery service uses the current mailing parameters for the piece of mail stored in the database so as to handle the piece of mail in accordance with the instructions of the account management system.

The indicia used with the piece of mail can take any form capable of relaying information to a mail delivery service. For example, it could be printed text information that is readable by a human. More likely, however, it will be in a machine-readable form, such as a bar code, magnetic strip, hologram, data in a radio frequency identification tag (RFID), or any other indicia that can be machine read.

In some embodiments, it may be advantageous for the indicia to not be machine readable, such that the sender is not confused by the mail delivery alteration information in the indicia, where such indicia is dictated by the recipient. For example, the recipient may dictate mailing parameters for the return mail that, if viewed by the sender, may cause the sender to not want to use the return mailer, such as rerouting of the mail to another address, changing the mode of delivery to a more expensive mode, etc.

Figure 1:
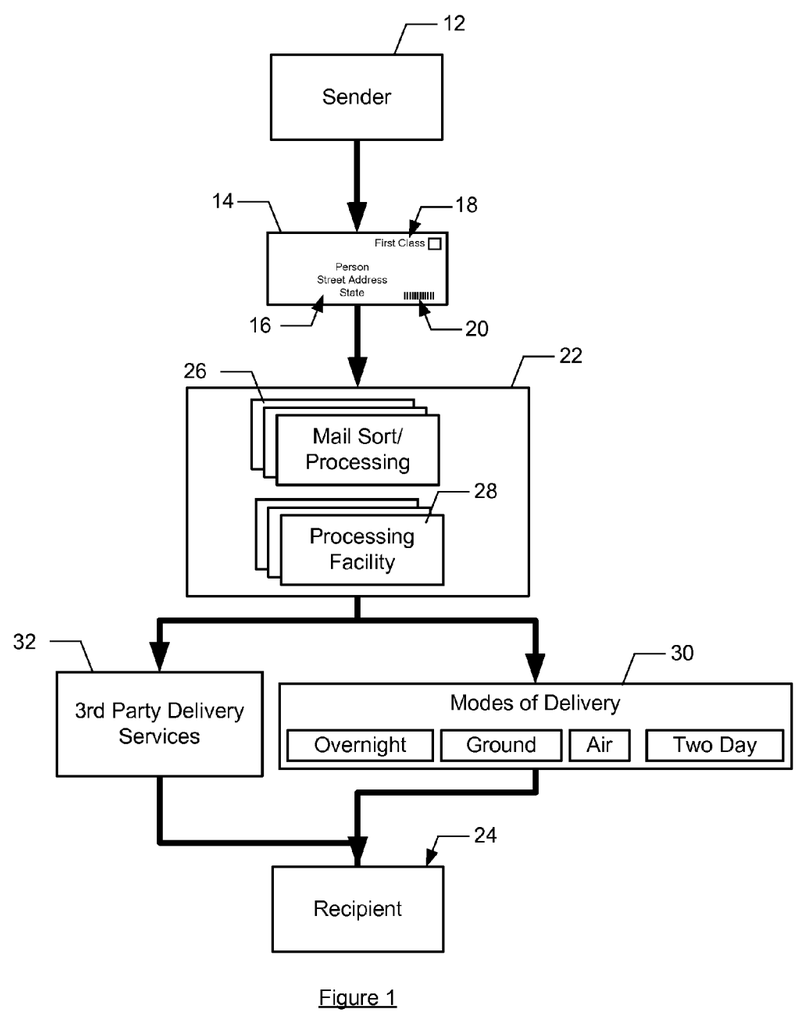
FIG. 1 is a system diagram illustrating operational flow at a system level according to one embodiment of the present invention.

FIG. 1 is a system diagram illustrating operational flow at a system level according to one embodiment of the present invention for delivery of a piece of mail from a sender 12 to a recipient 24, such as a customer. In this embodiment, the piece of mail 14 is initially created by the sender 12. It will include an initial recipient mailing address 16 and a mode of delivery 18, such as first class, overnight, certified mail, etc. (The mode of processing may either be expressed or is preset based on the mode of delivery selected). The piece of mail will also include an indicia 20 that comprise one or more of a different mailing address, mode of processing, or mode of mail delivery for the piece of mail. In some embodiments, the mailing parameters are stored in the indicia 20. In other embodiments to be discussed later, the indicia represents a unique identification for the piece of mail 14 or a class or category of mail that refers to a database containing mailing parameters for the piece of mail.

The piece of mail 14 is then provided to a mail delivery service 22 for delivery to a recipient 24. The mail delivery service may include multiple mail processing procedures and/or pathways 26 for processing the piece of mail. The mail delivery service may also include more than one processing facility 28 capable of processing the piece of mail. The mail delivery service 22 also includes different modes 30 of mail delivery, such as overnight, air, ground, two day delivery, etc. The mail delivery service 22 may also be able to send the piece of mail to another vendor third party delivery service 32 for processing and/or mailing depending on specific capabilities needed that might be present by another vendor, such as UPS®, Fed Ex®, DHL®, U.S. Post Office®, etc. The mail delivery service uses the indicia associated with the piece of mail, as opposed to the original mailing parameters associated with the piece of mail, if provided, to process and deliver the piece of mail. In this manner, the mailing processing and delivery of the piece of mail is dictated by the sender of the piece of mail independent of the original delivery address or other mailing parameters designated for the piece of mail. In some cases, the sender 12 may use a $3^{rd}$ party mail servicer to presort mail before going to the mail delivery service 22. This allows the sender to reduce postage costs by qualifying for discounts by aggregating mail by zip-code, for instance, before sending to the delivery service. In this case, the 3 party mail servicer could recognize indicia to redirect mail to $3^{rd}$ Party Delivery services 32 before ever entering the mail delivery service 22.

In some instance, the piece of mail may have no original mailing address, mode of processing, or mode of delivery at all. Instead, the mailing parameters for the piece of mail may be dictated by the indicia included on the mail. In some embodiments, the indicia itself may include the mailing parameters and in other instances, the mailing parameters may be stored in a database referenced by an identification number stored in the indicia. Where the mailing parameters are stored in the database, the mailing parameters for the piece of mail may be altered without requiring a user to physically alter either the parameters printed on the piece of mail or the indicia on the piece of mail.

Figure 2:
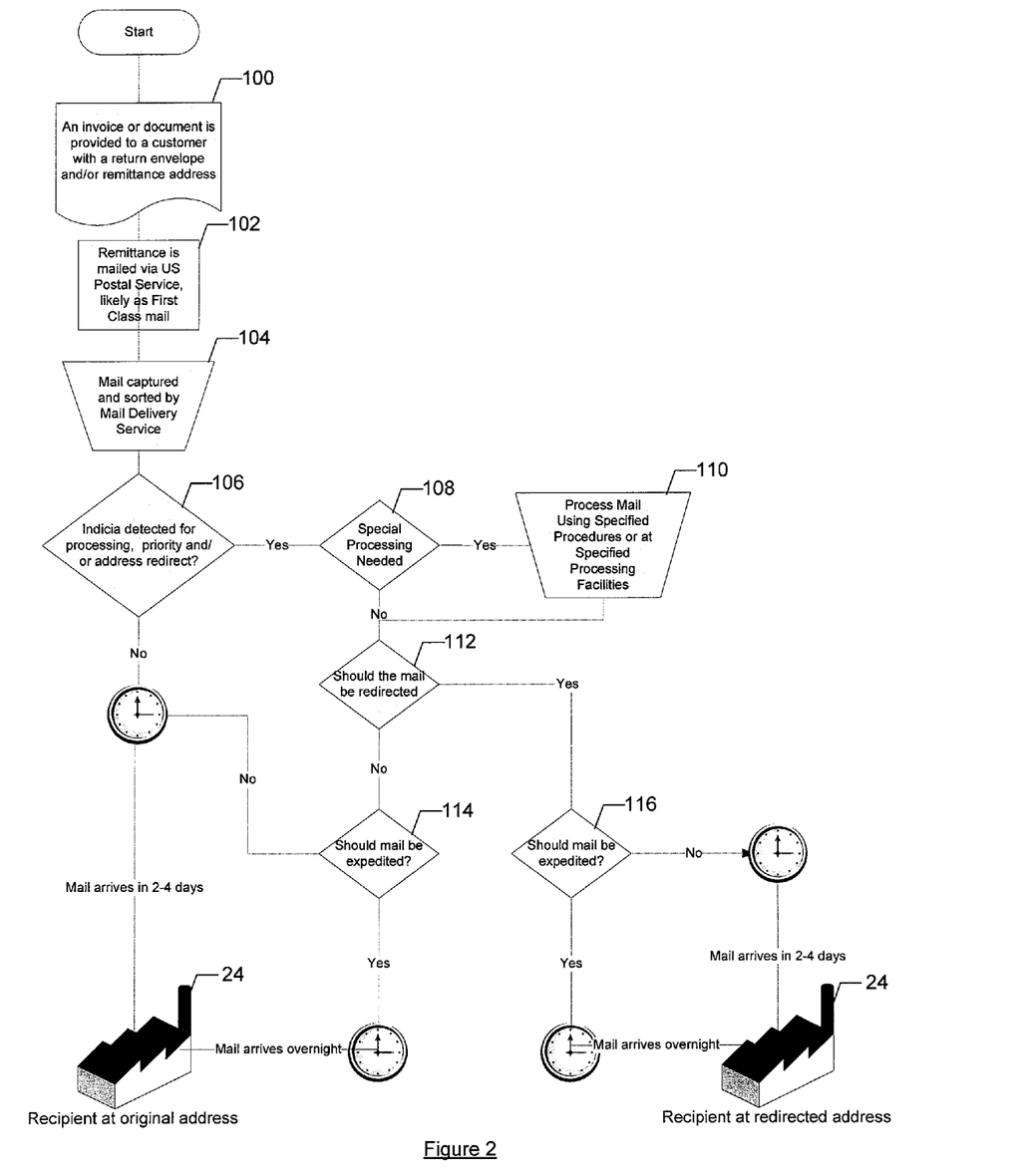
FIG. 2 is an operational flow diagram illustrating delivery of mail and altering of mailing parameters according to one embodiment of the present invention.

FIG. 2 illustrates a system flow diagram for altering mail delivery parameters according to one embodiment of the present invention. In this embodiment, the sender is a customer who has received a bill from an account management system, which requires the customer to return payment using a provided return mail envelope. The return envelope includes indicia provided on the envelope by the account management system indicating mailing parameters to be used by the mail delivery service to process and deliver the mail regardless of the mailing address, mode of mail processing, and/or mode of delivery indicated or used by the customer/sender in remitting payment using the return mailer. (See block 100).

The customer/sender prepares and sends the return mail envelope 14 with payment. (See block 102). As an example, the user may have included a hand written delivery address 16 on the return envelope and may have mailed the return envelope by first class mail 18. Both or either of which may be different from the instructions provided by the account management system in the indicia 20 associated with the return mail envelope 14.

The piece of mail 14 is received by the mail delivery service 22 and the indicia 20 are detected. (See blocks 104 and 106). It is first determined whether indicia include directions for special processing along a selected mail/sort processing path 26 and/or for processing at a specific mail processing facility 28. (See blocks 108 and 110). For example, the mail delivery service 22 may either have expedited processing and/or special procedures in place for processing mail from or to a particular entity. The mail delivery service may also have more than one mail processing facility, department, etc. for processing the mail. The indicia may either include instructions for mail processing or provide identification information regarding the account management system that indicate to the mail delivery service 22 special processing to be performed on the piece of mail 14.

The indicia may indicate a change in delivery address from that designated by the sender. (See block 112). For example, the customer/sender may have provided a mailing address 16 on the envelope that is different from that desired by the account management system. In these instances, the indicia 22 include the desired address of the account management system for delivery of the mail.

Finally, the indicia may include information regarding the mode of delivery 30 for the piece of mail. (See blocks 114 and 116). This typically involves the mode of transportation and/or guaranteed delivery time of the mail as disclosed in FIG. 2. However, in some embodiments, mode of delivery 30 could include mail delivery instructions such as deliver as certified mail, the mail should be handled with care, i.e., it is fragile, the mail should be handled under security, the mail may include hazardous material, etc. While not shown, the indicia may also dictate sending the mail to a third party mail delivery service vendor for processing or delivery.

As illustrated, the systems, methods, and computer program products of the present invention process and deliver the piece of mail as defined by the recipient 24 of the piece or mail based on indicia 22 associated with the mail by the recipient 24. In this manner, the recipient can more accurately control delivery and receipt of the mail.

In some embodiments, the indicia 22 may also be used by the sender 12, as opposed to the recipient 24 to dictate mail parameters for the piece of mail 14. As an example, an account management system may provide special mail services for specified customers. This could be used for customers with preferred accounts, customers that regularly handle large transactions via mail requiring special processing and/or security, customers who for financial reasons return payment nearer to end of deadline (thereby requiring expedited mail), etc. In these embodiments, the account management system may provide the customer/sender 12 with a unique indicia indicating that the piece of mail 14 should be handled using selected mail parameters. In its simplest form, the indicia could be a selected zip code written on the letter, which indicates to the mail delivery service 22 to deliver the piece of mail to the provided zip code regardless of what mailing address 16 is located on the piece of mail 14. It may also indicate use of a different mode of delivery, such as overnight. In this embodiment, the mail delivery service 22 would deliver the piece of mail 14 to a mailing address associated with the recipient/account management system 24 associated with the zip code listed by the sender/customer 12. Specifically, the account management system may be provided with a special zip-code for all their correspondence to provide overnight delivery at first class prices.

Figure 3:
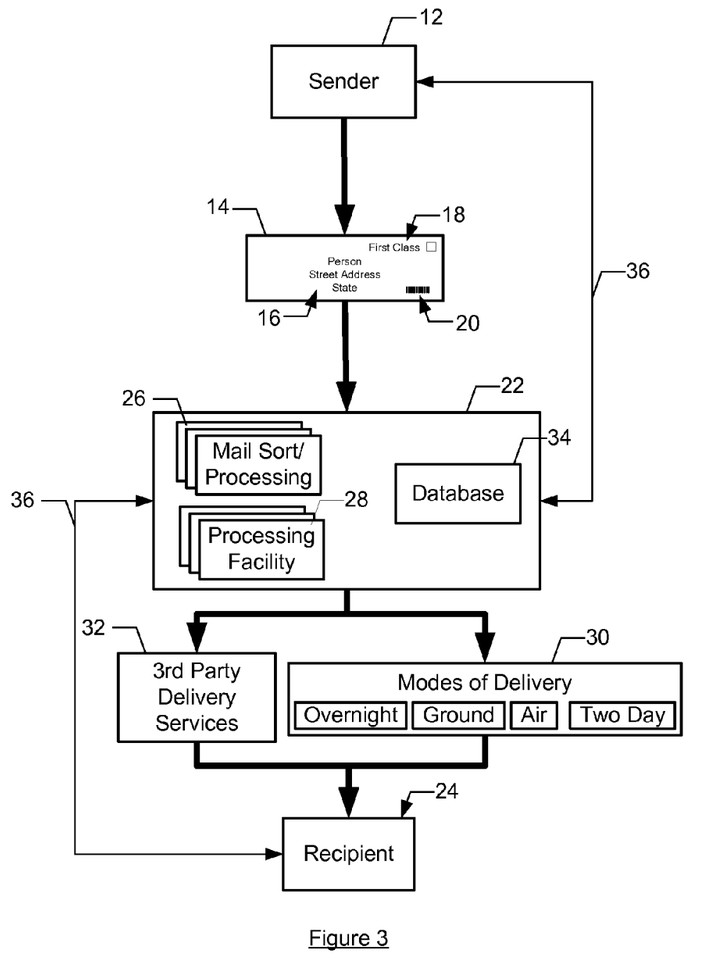
FIG. 3 is a system diagram illustrating operational flow at a system level according to another embodiment of the present invention.

FIG. 3 is a system diagram illustrating operational flow at a system level according to another embodiment of the present invention for delivery of a piece of mail from a sender 12 to a recipient 24, such as a customer. In this embodiment, the mail delivery service 22 further includes a storage device, such as a database 34. The database 34 includes mail parameters for either individual pieces of mail or classes or categories of mail, which are addressable using a unique identification address. In this embodiment, the indicia 20 on the piece of mail 14 is an identifier that points to a record in the database 34 including mailing parameters for the piece of mail 14. In this embodiment, when the piece of mail 14 is received for processing, the mail delivery service 22 will read the identifier from the indicia 20 and use the mailing parameters from the database 34 to dictate mail delivery address, mode of processing, and/or mode of delivery for the piece of mail.

In some embodiments, this system allows for real-time or semi-real time decisions to be made regarding the mail parameters for a piece of mail or class or category of mail. Specifically, because the mail parameters are stored in the database 34 and not embedded in the indicia 20, either one or both of the sender 12 and recipient 24 can update the mailing parameters for a piece of mail or a class or category of mail by communicating changes to the mail delivery service 22. (See communication lines 36).

For example, the account management system could decide to expedite receipt of all return mail including payments for receipt prior to end of fiscal year. In this instance, the account management system/recipient could communicate with the mail delivery service 22 to expedite delivery and/or send such mail to a special processing facility of the mail delivery service. It may also wish to the have the mail redirected to a specific address of the account management system for processing. These instructions would be stored in the database 34 for each identifier representing either individual pieces of mail or classes or categories of mail that will include return payments. Likewise, if given proper permission, the customer/sender 12 may also be able to alter the mailing parameters for a piece of mail by communicating instructions to the mail delivery service 22, such as for example where sending of payment was delayed by the sender and the sender wishes to now expedite.

While not shown in FIG. 2, in embodiments where the information in the database 34 may be altered at any time during mail processing and delivery, the mail delivery service either continuously or periodically checks the database for changes in mail parameters for a piece of mail being processed. If changes to a mail parameter are noted, the mail delivery service will alter mail delivery address, mail processing, and mode of delivery based on the changes made to the database for the piece of mail. In this manner, a sender and/or recipient may have the opportunity to alter mailing parameters for a piece of mail either real-time or semi-real time.

As an example, an account manager may operate more than one account processing facility located at different addresses, which are both capable of processing payments. It may be preferable to direct payments to either one of the facilities based on processing workloads at the facilities at a give time. Such processing workloads may be difficult to predict at the time the bill is sent with the return mail envelope to the customer. Real-time or semi-real-time determinations regarding routing of return mail may be needed in this instance.

In some instances, mail delivery services may have different processing procedures for different classes of mail, where higher class mail is processed more timely. Here again, it may be advantageous to indicate to the mail delivery service the desire to expedite certain mail regardless of how the sender initially sent the piece of mail. In some instances, the mail delivery service may have different facilities where a piece of mail may be processed. Providing an indication to the mail delivery service regarding expedited delivery may aid the mail service provider in determining which processing center to use for the mail processing based on current processing delays at each facility. In some instances, it may be advantageous to included indication on the piece of mail informing the mail processing service to process the piece of mail at a particular processing location that may either have expedited processing and/or special procedures in place for processing mail from or to a particular entity.

The systems, methods, and computer program products of the present invention allow for a sender or recipient, depending on the embodiment, to alter mailing parameters for piece of mail. Alterations in mailing parameters can be based on any criteria or reason determined by the sender or recipient. In some embodiments, the reason relates to a business parameter. In this embodiment, the piece of mail is analyzed based on at least one business parameter. A determination is made as to whether at least one of a different delivery address, mail processing mode, or a mode of delivery associated with the piece of mail should be altered based on the evaluation and providing an indicia for the piece of mail or storing mailing parameters in the database 34 conforming with the new delivery address, mode of processing, and/or mode of delivery. Some examples of possible business parameters are: category of the mail, a monetary value associated with the contents of the piece of mail, value or status of the customer, current interest rates, proximity in time to a fiscal date, etc.

The present invention also provides a customer service function. It may allow a customer to pay from one class of mail delivery, while the piece of mail is actually delivered by a second mode that is paid for by the account manager. For example, a return mailer sent with a bill may allow a customer to return the mailer using first class mail. However, indicia may be provided on the return mailer indicating to the mail delivery system to use a second mode of delivery for the return mailer, such as overnight. The overnight charge would be billed to the account manager and not the customer.

As another example, so as to avoid confusion by the customer, the return mailer may include a local address for sending the return mailer so as to provide a comfort level to the customer concerned with sending payments to non-familiar addresses or locations. However, the return mailer may also include indicia indicating to the mail delivery service to change the delivery address to a new selected address selected by the account manager when the piece of mail is delivered to the account manager.

Reasons other than the value of the contents of the mail may dictate expediting delivery. For example, a recipient may wish to expedite return mail sent by preferred customers. This may provide better customer service due to expedited response to customer correspondence.

The above description provides a few of the processes and procedures that may be implemented to alter mailing parameters for a piece of mail or class or category or mail. This is by no means an exhaustive list. All processes and procedures that allow either one or both a sender and recipient of mail the ability to alter mailing parameters for the piece of mail are contemplated.

The present invention can be implemented as a method, as a system, as computer instruction codes, as an apparatus and/or combinations of any of the above. Some of the claims of the application may be drafted in means-plus-function format. While the means recited in these claims can be implemented by any number of systems, devices, computer program code, etc., provided below are examples of structural systems that may meet the functions outlined by the recited means.

For example, the means for applying an indicia to a piece of mail, means for analyzing mailing parameters, means for altering mailing parameters, such as change of address, change in mail processing, and change in mode of delivery, means for determining when to alter a mailing parameter, etc., can be implemented as a processor or general computing element that uses software code instructions to perform these functions. The processor could, as an alternative, be an application specific IC chip that it hard-wired to perform the stated functions. The various means could also be met by a distributed network of processing elements that perform various portions of the recited functions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for altering delivery of a remittance being mailed from a mailer to a recipient, the method comprising:
   providing an indicia associated with the remittance, the indicia corresponding to one or more instructions for altering at least one of a delivery address, mode of processing, or mode of delivery from that originally designated for the remittance, the one or more instructions stored in a database configured for accepting one or more changes to the one or more instructions so that the originally designated delivery address, mode of processing, or mode of delivery may be changed after the indicia has been provided for the remittance;
   capturing and sorting, by a mail delivery service, the remittance;
   using a computer processor operating computer program code instructions stored in a non-transitory computer readable medium, wherein said computer program code instructions cause said computer processor to:
   after the indicia has been provided for the remittance, compare a monetary value, as determined by the recipient, associated with the contents of the remittance in view of current interest rates with a cost of altering one or more of the originally designated delivery address, the mode of processing or the mode of delivery;
   access the one or more instructions from the database; and
   alter the one or more instructions based on the comparison; and
   after the indicia has been provided for the remittance and after the one or more instructions have been altered, accessing the altered one or more instructions from the database; and
   altering at least one of the delivery address, mode of processing, or mode of delivery from that originally designated for the remittance based on the altered one or more instructions.

2. The method of claim 1 wherein said providing provides an indicia that is machine readable.

3. The method of claim 1 wherein said providing provides an indicia that is not human readable.

4. The method of claim 1 wherein said providing comprises providing the indicia as data in a Radio Frequency Identification (RFID) tag associated with the remittance.

5. The method of claim 1 wherein said providing comprises providing the indicia as data in a bar code associated with the remittance.

6. The method of claim 1, wherein the indicia of said providing indicates a mode of delivery, wherein the mode of delivery indicates a priority for transporting the remittance.

7. The method of claim 1, wherein the indicia of said providing indicates a mode of processing, wherein the mode of processing is selection of a mail processing facility.

8. The method of claim 1, wherein the indicia of said providing indicates a mode of processing, wherein the mode of processing is selection of a selected mail processing procedure.

9. The method of claim 1, wherein the indicia of said providing indicates a different mode of delivery than that originally designated for the remittance, wherein there is a difference in cost between the different mode of delivery and a mode of delivery originally designated for the remittance, and wherein the indicia indicates a party to which to charge the difference in cost.

10. The method of claim 9, wherein the party comprises the recipient of the remittance.

11. The method of claim 9, wherein the party comprises a party to whom the remittance is addressed.

12. The method of claim 1, wherein the indicia of said providing indicates a different mode of delivery than that originally designated for the remittance, wherein the different mode of delivery is an expedited mode of delivery relative to a mode of delivery originally designated for the remittance.

13. The method of claim 1, wherein said providing comprises providing the indicia on a return envelope that is provided to a customer for mailing a remittance.

14. The method of claim 1 wherein the mailer is a customer and the recipient is a business.

15. The method of claim 1 wherein the one or more instructions are further based on a proximity in time to a fiscal date of the recipient.

16. The method of claim 1 wherein providing the indicia associated with the remittance comprises providing a remittance envelope to the mailer, the remittance envelope comprising the indicia provided thereon.

17. The method of claim 14 wherein the recipient comprises a financial institution.

18. The method of claim 1, wherein the originally designated delivery address, mode of processing, or mode of delivery is originally designated by the mailer.

19. The method of claim 1, wherein the originally designated delivery address, mode of processing, or mode of delivery is originally designated by the recipient.

20. A system for altering delivery of a remittance being mailed from a mailer to a recipient, the system comprising:
a mail delivery service system comprising:
a processing device configured for:
accessing a database storing one or more instructions for altering at least one of a delivery address, mode of processing, or mode of delivery from that originally designated for the remittance;
after an indicia has been provided for the remittance, comparing a monetary value, as determined by the recipient, associated with contents of the remittance in view of current interest rates with a cost of altering one or more of the originally designated delivery address, the mode of processing or the mode of delivery; and
altering the one or more instructions based on the comparison; and
a mail sorting system in communication with said database, the mail sorting system comprising:
a processing device configured for analyzing the indicia associated with the remittance, and accessing the altered one or more instructions from the database; and
a mail routing system in communication with said mail sorting system, the mail routing system comprising:
a processing device configured for altering at least one of the delivery address, mode of processing, or mode of delivery for the remittance, based at least in part on the altered one or more instructions.

21. The system of claim 20 further comprising a database which contains information for each indicia comprising at least one of the delivery address, mode of processing, or mode of delivery, and an indicia identification.

22. The system of claim 20 wherein said mail sorting system comprises a reader capable of reading a machine-readable indicia.

23. The system of claim 20 further comprising:
a database which contains information for each indicia or group of indicia, the information comprising delivery address, mode of processing, or mode of delivery for the remittance associated with the indicia or group of indicia; and
an interface configured to allow a user to change the information for each indicia or group of indicia.

24. The system of claim 20, further comprising:
a cost charging system configured to:
determine a cost difference between a cost of the at least one of a different delivery address, mode of processing, or mode of delivery associated with the indicia and a cost of a delivery address, mode of processing, and/or mode of delivery originally designated for the remittance, and
charge the cost difference to a party associated with the remittance.

25. A computer program product for altering delivery of a remittance being mailed from a mailer to a recipient, the computer program product including a non-transitory computer-readable medium having computer program code embodied therein, the computer program code for causing a computer processor to:
provide an indicia associated with the remittance, the indicia corresponding to one or more instructions for altering at least one of a delivery address, mode of processing, or mode of delivery from that originally designated for the remittance, the one or more instructions stored in a database configured for accepting one or more changes to the one or more instructions so that the originally designated delivery address, mode of processing, or mode of delivery may be changed after the indicia has been provided for the remittance;
after the indicia has been provided for the remittance, compare a monetary value, as determined by the recipient, associated with the contents of the remittance in view of the current interest rates with the cost of altering one or more of the originally designated delivery address, the mode of processing or the mode of delivery;
access the one or more instructions from the database; and
alter the one or more instructions based on the comparison.

26. The computer program product of claim 25 wherein said instructions for providing provides an indicia that is machine readable.

27. The computer program product of claim 25 wherein said instructions for providing provides indicia that indicates a mode of delivery, wherein the mode of delivery indicates a priority for transporting the remittance.

* * * * *